United States Patent [19]
Preston et al.

[11] Patent Number: 5,533,164
[45] Date of Patent: Jul. 2, 1996

[54] OPTICAL FIBRE ASSEMBLIES FOR BLOWN INSTALLATION

[75] Inventors: Roger S. Preston, Royston; David B. Smith, Harlow, both of England

[73] Assignee: Pirelli General plc, London

[21] Appl. No.: 315,543

[22] Filed: Sep. 30, 1994

[30]   Foreign Application Priority Data

Oct. 1, 1993 [GB] United Kingdom .................. 9320282

[51] Int. Cl.$^6$ .................................................. G02B 6/02
[52] U.S. Cl. .................... 385/128; 385/100; 385/126; 385/127; 385/123
[58] Field of Search .................................. 385/100, 102, 385/123, 126, 127, 128, 141, 134

[56]   References Cited

U.S. PATENT DOCUMENTS

| | | | |
|---|---|---|---|
| 5,042,907 | 8/1991 | Bell et al. ............................. | 385/123 |
| 5,062,685 | 11/1991 | Cain et al. ........................... | 385/114 X |

FOREIGN PATENT DOCUMENTS

| | | | |
|---|---|---|---|
| 0345968 | 12/1989 | European Pat. Off. ........... | 385/128 X |
| 0521710A1 | 7/1992 | European Pat. Off. ........... | 385/128 X |
| 2924495A1 | 1/1981 | Germany ............................ | 385/128 X |
| 4186204 | 7/1992 | Japan ................................. | 385/128 X |
| 4336507 | 11/1992 | Japan ................................. | 385/128 X |
| 4336506 | 11/1992 | Japan ................................. | 385/128 X |

*Primary Examiner*—Brian Healy
*Attorney, Agent, or Firm*—Finnegan, Henderson, Farabow, Garrett and Dunner

[57]   ABSTRACT

An optical fibre assembly 10 for blown installation, comprises a fibre unit 12 having at least one optical fibre 14. The unit has a coating comprising an external layer 18 of a material containing hollow glass beads 22 at least some of which project from the outer surface 24 of the external layer. The coating also has an inner, buffer layer 16 of a material having a lower modulus of elasticity than that of the material of the external layer and an intermediate layer 20 of material disposed between the external and inner layers.

10 Claims, 1 Drawing Sheet

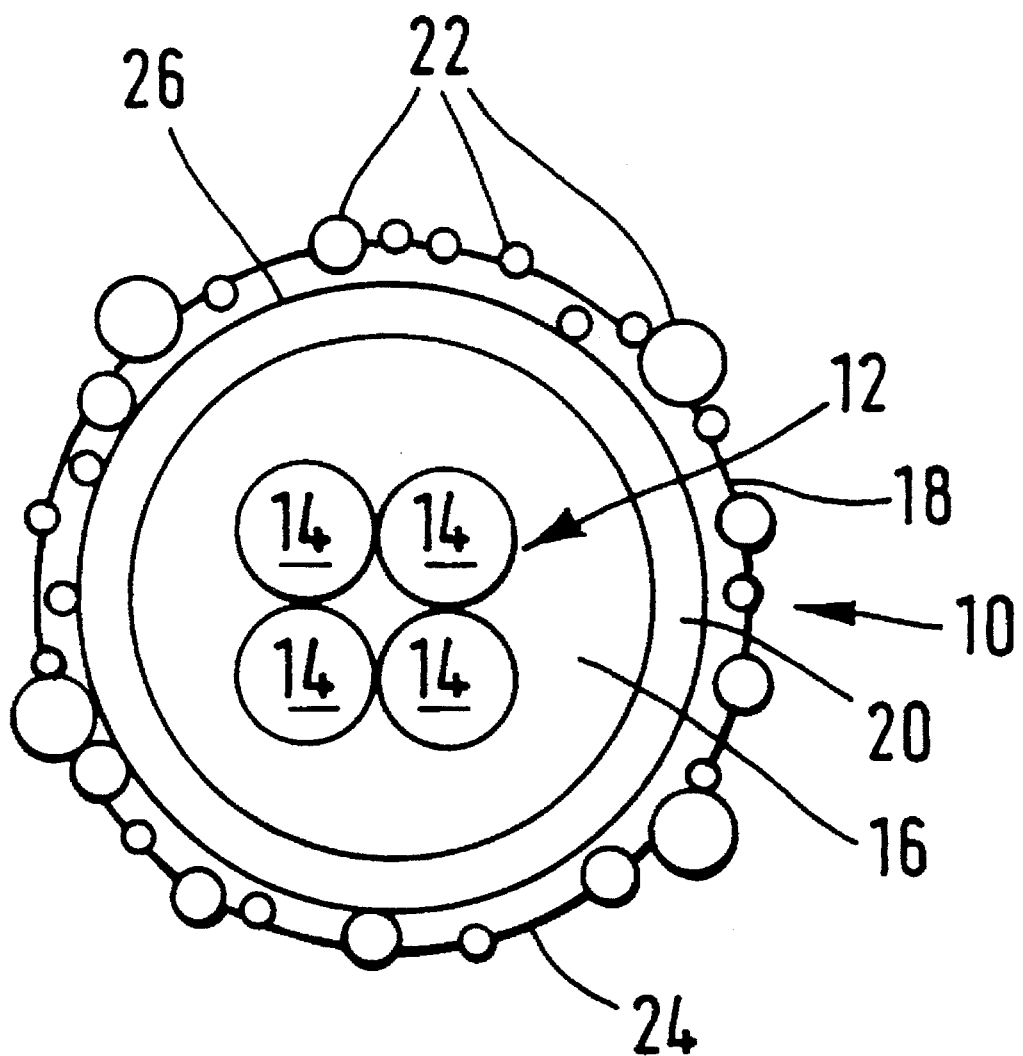

OPTICAL FIBRE ASSEMBLIES FOR BLOWN INSTALLATION

BACKGROUND OF THE INVENTION

This invention relates to optical fibre assemblies for blown installation and more particularly to such assemblies as disclosed in EP-A-0345968 and EP-A-0521710 (to which reference is directed) in which the assembly comprises an optical fibre unit having at least one coated optical fibre. The coating includes at least one coating. The fibre unit has a coating comprising an external layer disposed over an inner, buffer layer, the external layer containing particulate matter which projects from the outer surface of that layer.

Like EP-A-0521710, this invention is particularly concerned with such assemblies in which the optical fibre unit comprises a plurality of coated optical fibres. Nevertheless, it is also applicable to such assemblies in which the optical fibre unit comprises just one optical fibre as in the illustrated embodiments of EP-A-0345968 where the coating of the optical fibre includes two coatings—a soft primary buffer coating and a hard secondary coating.

In EP-A-0345968 the particulate matter is mixed with the material of the external coating prior to application of that coating. However, this leads to the presence of the particulate matter at the interface between the external layer and the inner buffer layer which, it is concluded in EP-A-0521710, is the probable cause of poor "fibre breakout" performance on bending. This is particularly the case when the system of EP-A-0345968 is applied to such optical fibre assemblies in which the optical fibre unit comprises a plurality of coated optical fibres and thus need to have larger diameters than assemblies in which the fibre unit comprises a single optical fibre.

To overcome this problem of poor fibre breakout performance, EP-A-0521710 adds the particulate matter to the external layer after it has been applied. Therefore, the innermost part of the layer is substantially free of the particulate matter.

SUMMARY OF THE INVENTION

One object of the present invention is to avoid the problems identified in EP-A-0521710 of poor fibre breakout performance in the system disclosed in EP-A-0345968 due to the presence of the particulate matter at the interface between the external layer and the buffer layer. To this end, the invention broadly provides an intermediate layer between the external and buffer layers for arresting any cracks propagating from the inner surface of the external layer due to the presence of the particulate matter there adjacent towards the inner layer.

The invention includes an optical fibre assembly for blown installation, comprising a fibre unit including at least one coated optical fibre. The coating on the optical fibre includes at least one coating. The unit has an outer coating including an external layer of a material containing particulate matter at least some of which matter projects from the outer surface of the external layer, an inner layer of a material having a lower modulus of elasticity than that of the material of the external layers and an intermediate layer of material disposed between the external and inner layers.

The particulate matter may comprise substantially spherical beads, which may be glass and are preferably hollow. The ratio of the average diameter of the beads to the average thickness of the external layer is preferably from 1:0.5 to 1:0.9. Typically, the average diameter of the beads is about 35 µm and the average thickness of the external layer is from 20 to 30 µm.

In an embodiment of the invention the fibre unit comprises four coated fibres. Each coating includes one or more coatings. In this embodiment the average outside diameter of the external layer is about 910 µm.

Preferably the modulus of elasticity of the material of the intermediate layer is equal to, or substantially equal to, the modulus of elasticity of the material of the external layer.

In order that the invention may be well understood, an embodiment thereof which is given by way of example only will now be described with reference to the accompanying drawing.

BRIEF DESCRIPTION OF THE DRAWING

The single figure is a schematic cross-section of an optical fibre assembly for blown installation.

DETAILED DESCRIPTION OF THE PREFERRED EMBODIMENTS

The illustrated assembly 10 comprises a fibre unit 12 comprising a plurality of coated optical fibres 14. The illustrated unit 12 comprises four coated optical fibres, but it is to be understood that it may comprise a number of fibres other than four, for example eight, or only one fibre.

Each coated fibre 14 is provided with primary and secondary coatings as is conventional and the coated fibres are disposed with their secondary coatings touching. The fibre unit 12 is provided with a coating comprising an inner layer 16, an external layer 18 and an intermediate layer 20. Each layer comprises a radiation-cured polymer. The inner layer comprises a material having a lower modulus of elasticity than that of the external layer and forms a soft buffer layer for the fibre unit. The external layer is harder and more robust than the buffer layer and functions to protect the buffer layer and fibre unit. The external layer 18 contains particulate material in the form of hollow glass beads 22, some of which project from the outer surface 24 of the external layer 18. It will also be noted that some of the beads are disposed adjacent the inner surface 26 of the external layer 18. It is this disposition of the beads which is considered in EP-A-0521710 to initiate the formation of cracks during bending of the assembly. It is also believed that cracks in the external layer may be initiated from the outer surface thereof. The intermediate layer is provided to arrest the propagation of cracks in the external layer towards the inner buffer layer and may be formed of the same material as the material of the external layer, but does not contain any beads 22. In this case the modulus of elasticity of the material of the intermediate layer is the same as that of the external layer. However, it is to be understood that it may be formed of another material but the modulus of elasticity, and/or the thickness, of the intermediate layer is selected to enable the assembly to have a desired overall stiffness.

In the illustrated embodiment the outside diameter of the inner layer is 800 µm, the outside diameter of the intermediate layer is 850 µm and the outside diameter of the external layer is 910 µm. The average diameter of the beads contained in the external layer is 35 µm, and accordingly with close tolerances on the layer and bead diameters the required amount of bead projection from the outer surface of the external layer for good blowability is provided.

In the disclosed embodiment, the materials forming the layers are UV curable multi-functional acrylates. Specifically the material forming the inner layer is Cablelite 3287-9-37, the material forming the intermediate layer is Cablelite 950-705 or Zeneca NEP 87 and the external layer which contains the beads is formed from Zeneca NEP 86. Cablelite and Zeneca are trade names of DSM Desotech BV and Zeneca, respectively.

As will be appreciated from the above, the requirement of bead projection from the outer surface of the external layer is incompatible with the requirement for there to be an absence of beads adjacent the inner surface of the external layer in the method disclosed in EP-A-0345968. Unless the bead diameter is greater than the thickness of the external layer, in which case beads will be positioned adjacent the inner surface, bead projection cannot be guaranteed. If the diameter of the beads is less than the thickness of the external layer neither bead projection from the outer surface nor absence of beads adjacent the inner surface can be guaranteed. In fact, in these circumstances the situation is aggravated because the beads sink in the material of the external layer as it is applied in liquid form. The use of an intermediate crack arresting layer avoids the problems associated with the location of the beads adjacent the inner surface and allows the use of beads with a greater diameter than the thickness of the external layer.

Additionally, the use of an intermediate layer provides a means by which the overall stiffness of the optical fibre assembly may be adjusted to a value which provides good blow characteristics, since the thickness and modulus of elasticity of the intermediate layer are both variables which can alter this overall stiffness.

What is claimed is:

1. An optical fibre assembly for blown installation, comprising:
    a fibre unit having at least one coated optical fibre, the coating formed of at least one coating; and
    an outer coating surrounding the unit, the outer coating having an external layer with an outer surface formed of a material containing particulate matter at least some of which projects from the outer surface of the external layer, an inner layer formed of a material having a lower modulus of elasticity than that of the external layer, and an intermediate layer, lacking particulate matter, disposed between the external and inner layers;
    wherein the intermediate layer suppresses the propagation of cracks in the optical fibre assembly.

2. The optical fibre assembly of claim 1, wherein the particulate matter includes substantially spherical beads and the ratio of the average diameter of the beads to the average thickness of the external layer is from 1:0.5 to 1:0.9.

3. The optical fibre assembly of claim 2, wherein the average diameter of the beads is about 35 µm and the average thickness of the external layer is from 20 to 30 µm.

4. The optical fibre assembly of claim 1, wherein the fibre unit includes four of said coated optical fibres.

5. The optical fibre assembly of claim 4, wherein the average outside diameter of the external layer is about 910 µm.

6. The optical fibre assembly of claim 1, wherein the modulus of elasticity of the material of the intermediate layer equals, or substantially equals, the modulus of elasticity of the material of the external layer.

7. An optical fibre assembly for blown installation, comprising:
    a fibre unit having at least one coated optical fibre, the coating being formed of at least one coating; and
    an outer coating surrounding the unit, the outer coating having an external layer having an outer surface, the external layer being of a material containing particulate matter at least some of which projects from the outer surface of the external layer, an inner layer of a material having a lower modulus of elasticity than that of the material of the external layer, and an intermediate layer of material disposed between the external and inner layers, wherein the particulate matter includes substantially spherical beads and the ratio of the average diameter of the beads to the average thickness of the external layer is from 1:0.5 to 1:0.9.

8. The optical fibre assembly of claim 7, wherein the average diameter of the beads is about 35 µm and the average thickness of the external layer is from 20 to 30 µm.

9. An optical fibre assembly for blown installation, comprising:
    a fibre unit having at least one coated optical fibre, the coating being formed of at least one coating; and
    an outer coating surrounding the unit, the outer coating having an external layer having an outer surface, the external layer being of a material containing particulate matter at least some of which projects from the outer surface of the external layer, an inner layer of a material having a lower modulus of elasticity than that of the material of the external layer, and an intermediate layer of material disposed between the external and inner layers, wherein the fibre unit includes four coated optical fibres, and wherein the average outside diameter of the external layer is about 910 µm.

10. An optical fibre assembly for blown installation, comprising:
    a fibre unit having at least one coated optical fibre, the coating being formed of at least one coating; and
    an outer coating surrounding the unit, the outer coating having an external layer having an outer surface, the external layer being of a material containing particulate matter at least some of which projects from the outer surface of the external layer, an inner layer of a material having a lower modulus of elasticity than that of the material of the external layer, and an intermediate layer of material disposed between the external and inner layers, wherein the modulus of elasticity of the material of the intermediate layer equals, or substantially equals, the modulus of elasticity of the material of the external layer.

* * * * *